(12) United States Patent
Tsuchiya

(10) Patent No.: US 10,688,666 B2
(45) Date of Patent: Jun. 23, 2020

(54) EDUCATIONAL TOY AND PANEL USED FOR THE SAME

(71) Applicant: ICON CORP., Yokohama-shi, Kanagawa (JP)

(72) Inventor: Toshiko Tsuchiya, Yokohama (JP)

(73) Assignee: ICON CORP., Yokohama (JP)

( * ) Notice: Subject to any disclaimer, the term of this patent is extended or adjusted under 35 U.S.C. 154(b) by 259 days.

(21) Appl. No.: 15/840,327

(22) Filed: Dec. 13, 2017

(65) Prior Publication Data

US 2018/0264652 A1    Sep. 20, 2018

(30) Foreign Application Priority Data

Mar. 15, 2017  (JP) .................................. 2017-049399

(51) Int. Cl.
  *A63F 9/20*  (2006.01)
  *B25J 9/16*  (2006.01)
  (Continued)

(52) U.S. Cl.
  CPC ............ *B25J 9/1697* (2013.01); *A63H 11/00* (2013.01); *A63H 17/36* (2013.01); *A63H 17/395* (2013.01); *A63H 18/16* (2013.01); *A63H 33/26* (2013.01); *G09B 5/00* (2013.01); *G09B 19/0053* (2013.01); *A63H 3/006* (2013.01); *A63H 3/28* (2013.01);
  (Continued)

(58) Field of Classification Search
  USPC ........................................................ 700/264
  See application file for complete search history.

(56) References Cited

U.S. PATENT DOCUMENTS 4,990,117 A * 2/1991 Yonezawa ............... A63H 18/10
                                                    446/129
6,089,951 A * 7/2000 Ostendorff ........... A63H 18/005
                                                    446/409
(Continued)

FOREIGN PATENT DOCUMENTS

JP         2010-167149         8/2010

OTHER PUBLICATIONS

Sullivan et al., "KIBO Robot Demo: Engaging Young Children in Programming and Engineering", XP-002781779, IDC '15, Jun. 21-25, 2015, Medford, MA, USA.
(Continued)

*Primary Examiner* — Masud Ahmed
(74) *Attorney, Agent, or Firm* — Staas & Halsey LLP

(57) ABSTRACT

Provided is an educational toy that enables even an infant of low age to easily play with interest. One or a plurality of command panels 121 are arranged to form a moving path 120, the command panels 121 including command information readable by a reading module. The movable robot 110 sequentially reads, using the reading module, the command information included in the command panel 121 over which the movable robot 110 passes, while moving on the moving path 120, and sequentially performs an action corresponding to the read command information. The actions performed by the movable robot 110 include at least any one of starting a movement, stopping the movement, rotating, changing a moving direction to a predetermined direction, flashing a light emitting portion of the movable object in a predetermined color, and replaying sound.

16 Claims, 7 Drawing Sheets

(51) Int. Cl.
  *G09B 19/00* (2006.01)
  *G09B 5/00* (2006.01)
  *A63H 33/26* (2006.01)
  *A63H 18/16* (2006.01)
  *A63H 17/36* (2006.01)
  *A63H 11/00* (2006.01)
  *A63H 17/395* (2006.01)
  *A63H 3/00* (2006.01)
  *A63H 3/28* (2006.01)

(52) U.S. Cl.
  CPC ......... *A63H 2200/00* (2013.01); *Y10S 901/47* (2013.01)

(56) References Cited

U.S. PATENT DOCUMENTS

| | | | | |
|---|---|---|---|---|
| 6,102,770 A * | 8/2000 | Cyrus | ................... | A63H 18/14 446/129 |
| 6,322,415 B1 * | 11/2001 | Cyrus | ................... | A63H 18/14 446/130 |
| 9,333,427 B2 * | 5/2016 | Sabo | ....................... | A63F 13/12 |
| 2002/0102910 A1 * | 8/2002 | Donahue | ................ | A63H 18/16 446/465 |
| 2011/0294391 A1 * | 12/2011 | Todd | ..................... | A63H 18/14 446/129 |
| 2013/0288560 A1 * | 10/2013 | Abou-Hamda | ...... | A63H 33/005 446/175 |
| 2017/0007915 A1 * | 1/2017 | Moscatelli | ............. | G09B 23/00 |

OTHER PUBLICATIONS

Kwon et al., "Algorithmic Bricks: A Tangible Robot Programming Tool for Elementary School Students", IEEE Transactions on Education, vol. 55, No. 4, Nov. 2012.

Extended European Search Report dated Jun. 26, 2018, in corresponding European Patent Application No. 17207814.9.

* cited by examiner

EDUCATIONAL TOY AND PANEL USED FOR THE SAME

CROSS-REFERENCE TO RELATED APPLICATION

This application claims the benefit of Japanese Patent Application No. 2017-049399, filed on Mar. 15, 2017, in the Japanese Intellectual Property Office, the disclosure of which is incorporated herein by reference.

BACKGROUND OF THE INVENTION

Field of the Invention

The present invention relates to a toy that causes a movable object to move on a traveling path. The present invention applies to a toy which is useful for intellectual training and is suitably designed for, for example, infants to learn basic computer programming.

Description of the Related Art

A toy disclosed in Japanese Patent Laid-Open No. 2010-167149 is known as one example of toys that cause a movable object of self-running type to move on a moving path. In the toy disclosed in Japanese Patent Laid-Open No. 2010-167149, patterns for data and patterns for clocking are formed on a traveling surface. The movable object moves on the traveling surface while reading the two types of patterns. The movable object obtains control information using the two types of patterns being read.

A toy disclosed in U.S. Pat. No. 9,333,427 is known as one example of toys that can appropriately change a motion of an object based on commands arbitrarily set by a player. In the toy disclosed in U.S. Pat. No. 9,333,427, a motion of an avatar displayed on a screen of a display can be arbitrarily set by placing a desired activity block in a pocket of a master block (i.e., an operation device).

SUMMARY OF THE INVENTION

The inventors of the present application have considered an intellectual toy designed for, for example, infants being up to three years-old children to learn basic computer programming.

However, it seems difficult for, for example, infants being up to three years-old children to understand computer languages. Accordingly, it is desirable to enable such infants to learn a computer programming technique without using programming languages.

It also seems difficult for, for example, infants being up to three years-old children to learn the computer programming using a screen of a display and an operating device, because it is not easy for children of low age to manipulate the operating device while viewing the display screen, and it thereby seems difficult to arouse the children's interest.

An object of the present invention is to provide a toy that enables even an infant of low age to easily play with interest.

To solve such a problem, in an educational toy that causes a movable object of self-running type to move on a moving path according to the invention according to claim 1, the educational toy includes a plurality of command panels including command information readable by a reading module provided in the movable object, the moving path is configured by arranging, in an arbitrary sequence, a part or all of the command panels arbitrarily selected by a player, and the movable object sequentially reads, using the reading module, the command information included in the command panel over which the movable object passes, while moving on the moving path, and sequentially performs an action corresponding to the command information being read.

In the educational toy according to the invention of claim 2, in addition to the configuration described in claim 1, the command information included in the command panel is pattern information formed to be readable by an optical reading module.

In the educational toy according to the invention of claim 3, in addition to the configuration described in claim 1 or 2, the movable object detects a position of the command information formed on the command panel whereby allowing to determine a deviation of an actual trajectory relatively from a preset trajectory and correct the actual trajectory to the preset trajectory.

In the educational toy according to the invention of claim 4, in addition to the configuration described in any one of claims 1 to 3, the actions performed by the movable object include at least any one of starting a movement, stopping the movement, rotating, changing a moving direction to a predetermined direction, flashing a light emitting section of the movable object in a predetermined color, and replaying sound.

In the educational toy according to the invention of claim 5, in addition to the configuration described in any one of claims 1 to 4, the plurality of command panels include one command panel to cause the movable object to perform the plurality types of actions based on the command information included in the one command panel.

In the educational toy according to the invention according to claim 6, in addition to the configuration described in any one of claims 1 to 5, the plurality of command panels include a plurality of command panels to cause the movable object to perform one type of action based on a combination of a plurality of the command information respectively included in each of the plurality of command panels.

In a panel according to the invention according to claim 7, the panel is used as the command panel according to any one of claims 1 to 6.

According to the invention of claim 1, a player forms a moving path by arbitrarily arranging command panels respectively including command information, and a movable object sequentially reads the command information while moving on the moving path, thereby it can be enabled to determine a series of actions of the movable object. Accordingly, according to the invention of claim 1, the player can freely set the series of actions of the movable object without using a display and an input device.

According to the invention of claim 2, the command information included in the command panel is formed to be readable by an optical reading module, thereby it can be enabled to provide the educational toy at low cost.

According to the invention of claim 3, the movable object corrects a trajectory of the movable object in accordance with the detected position of the command information, thereby it can be enabled to easily prevent the movable object from deviating from the moving path.

According to the invention of claim 4, the actions performed by the movable object include at least any one of a forward movement operation, a stop operation, a rotating operation, an moving direction change operation, a light flashing operation, and a sound replaying operation, thereby it can be enabled to provide an amusement that even an infant of low age can play with interest.

According to the invention of claim 5, the movable object performs a plurality types of actions based on the command information included in one command panel, thereby improving amusement of the toy.

According to the invention of claim 6, the actions of the movable object are determined based on the combination of a plurality of command information respectively included in each of the plurality of command panels, thereby it can be enabled to provide a playing mode with a slightly higher difficulty level compared with a case of determining the action of the movable object based on only the command information included in the one command panel.

According to the invention of claim 7, the command panel used for the computer educational toy of the present invention can be provided.

DETAILED DESCRIPTION OF THE PREFERRED EMBODIMENTS

Embodiment 1 of the Invention

Embodiment 1 of the present invention will be described using FIG. 1 to FIG. 6.

Figure 1:
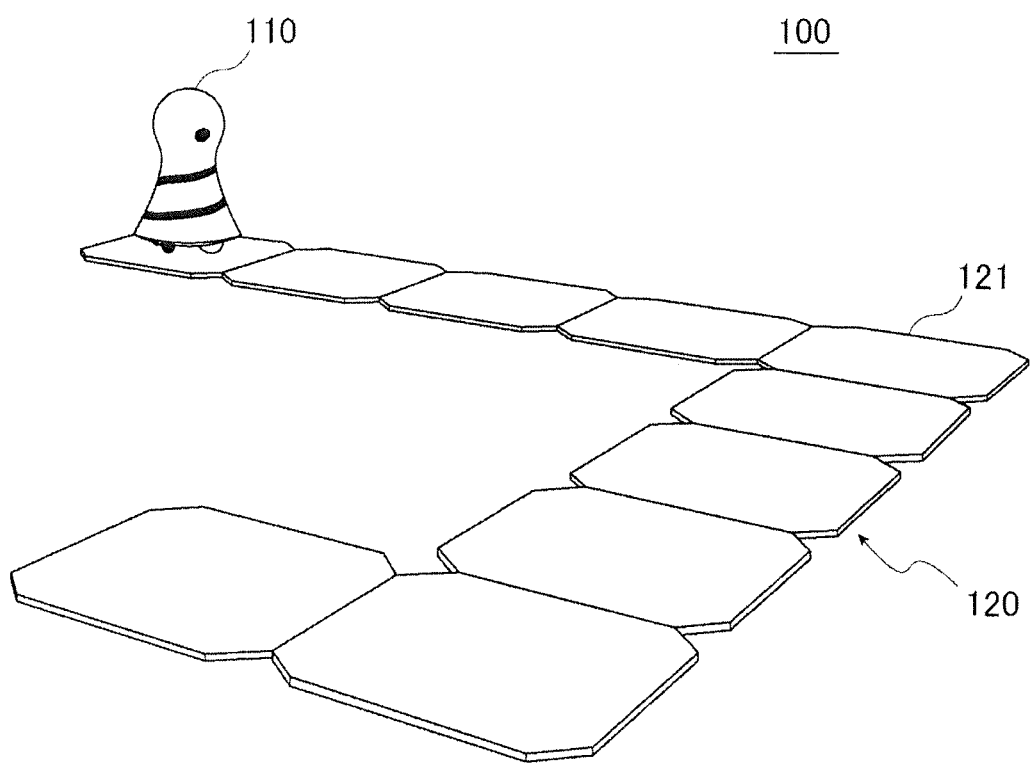
FIG. 1 is a schematic perspective view illustrating an entire configuration of an educational toy according to Embodiment 1 of the present invention.

As illustrated in FIG. 1, an educational toy 100 according to Embodiment 1 includes one movable robot 110 (equivalent to a "movable object" of the present invention) and a moving path formed of a plurality of command panels 121. The movable robot 110 performs various actions in accordance with each type of command panels 121 while moving on the command panels 121 as described later.

Figure 2A:
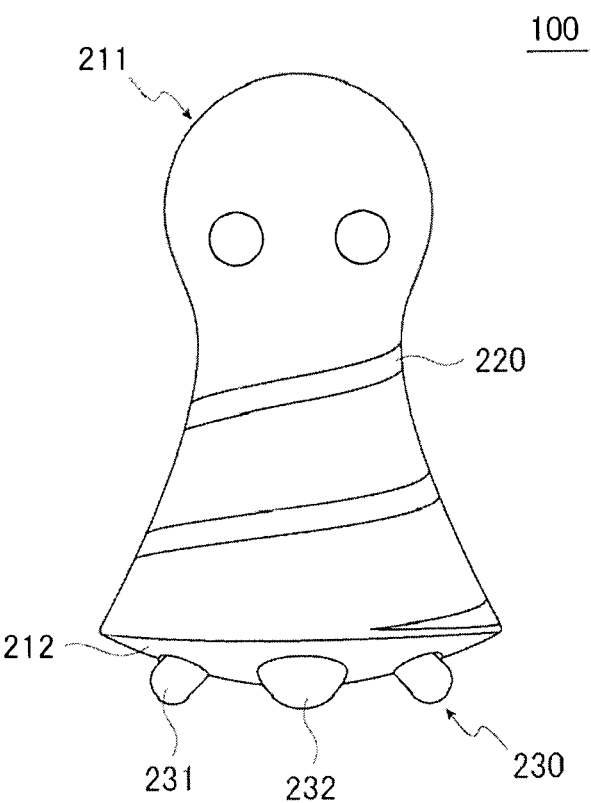
FIG. 2(A) is a schematic front view illustrating a movable robot according to Embodiment 1 of the present invention.
Figure 2B:
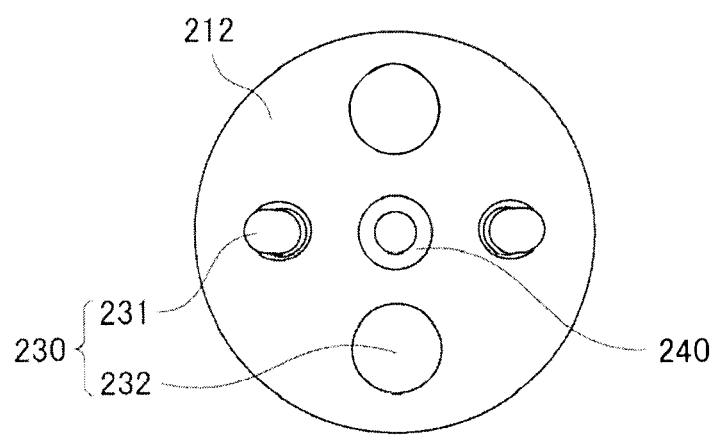
FIG. 2(B) is a bottom view illustrating the movable robot according to Embodiment 1 of the present invention.

As illustrated in FIGS. 2(A), 2(B), the movable robot 110 includes a main body 211 and a bottom surface 212. The movable robot 110 is provided with a movement function, a light flashing function, and a sound reproduction function as described later, but may be provided with another function.

It is preferred that the main body 211 is formed of a material such as a resin which has high safety for infants, and a spherical shape and a conical shape are combined to form the main body 211. The main body 211 may be formed in any arbitrary shape and dimension. A control circuit 600 (see FIG. 6) and a battery (not illustrated) are stored inside of the main body 211.

A light emitting portion 220 is provided in a side surface of the main body 211, and is formed of a material such as a resin which has high safety for infants. The light emitting portion 220 can generate light in any arbitrary color using an RGB light source 602 (for example, using an LED, not illustrated in FIG. 1 and FIGS. 2(A), 2(B)) provided inside of the main body 211. In Embodiment 1, the light emitting portion 220 is formed into a spiral shape, but the light emitting portion 220 may be formed in any arbitrary shape.

It is preferred that the bottom surface 212 is formed of a material such as a resin which has high safety for infants, and the bottom surface 212 has a protrusion protruding downwardly thereon. The bottom surface 212 may be formed in any arbitrary shape. As illustrated in FIG. 2(A) to FIG. 4, the bottom surface 212 is provided with a moving mechanism 230 and an optical reading module 240.

Figure 3:
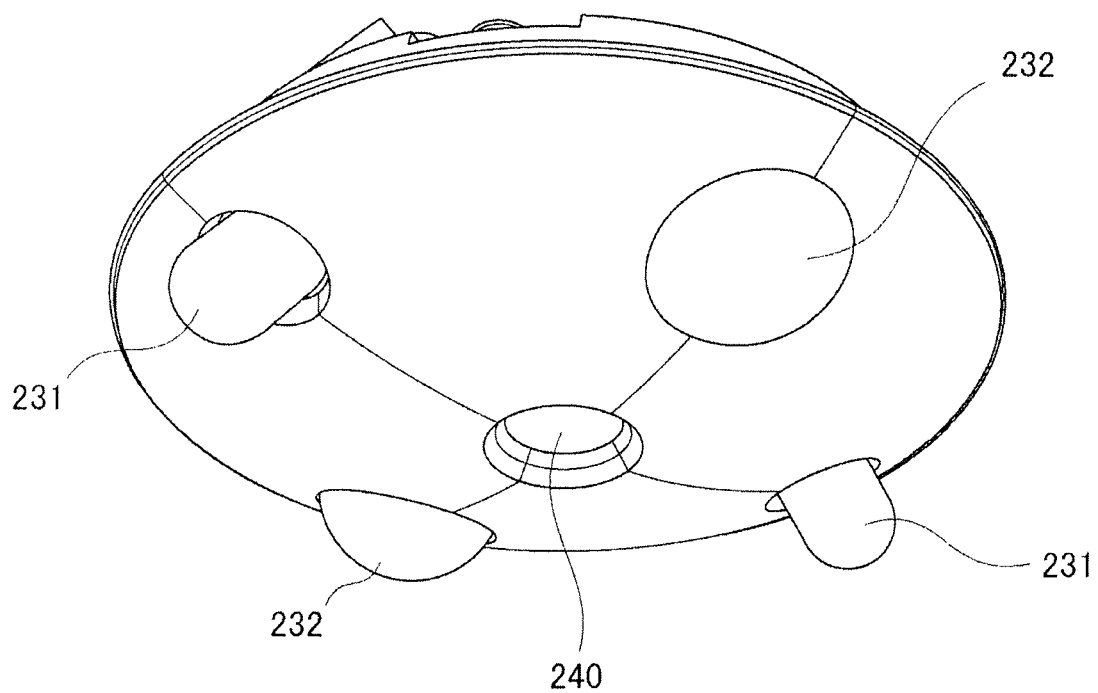
FIG. 3 is a schematic perspective view illustrating a moving mechanism as viewed from a lower side of the movable robot according to Embodiment 1 of the present invention.

The moving mechanism 230 is a mechanism to move and rotate the movable robot 110. The moving mechanism 230 is provided with a pair of rotary legs 231 and a pair of auxiliary balls 232 as illustrated in FIGS. 2(A), 2(B) and FIG. 3.

Figure 4:
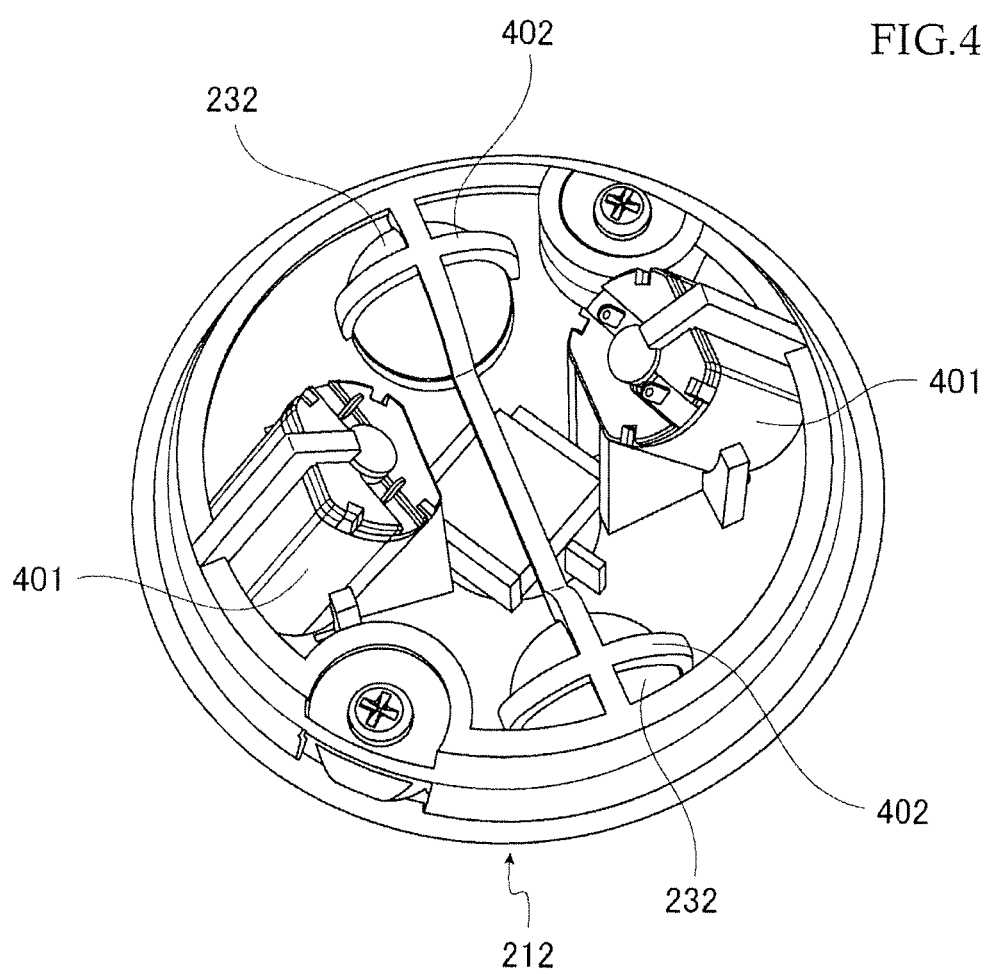
FIG. 4 is a schematic perspective view illustrating the moving mechanism as viewed from an upper side of the movable robot according to Embodiment 1 of the present invention.

The pair of rotary legs 231 are arranged to protrude from the vicinity of an outer edge of the bottom surface 212 in an outward inclined state. The rotary legs 231 are arranged at symmetrical positions with respect to a center of the bottom surface 212. Each of the rotary legs 231 has a spherical surface formed at a tip end thereof to contact with a floor surface. As illustrated in FIG. 4, the rotary legs 231 are connected to driving axes (not illustrated) of a pair of motors 401 arranged inside of the main body 211, respectively, thereby being rotationally driven by the driving axes.

The pair of auxiliary balls 232 are rotatably provided in the vicinity of the outer edge of the bottom surface 212 in a state protruding from the bottom surface 212. In other words, the auxiliary balls 232 are only supported on a support member 402 provided above the bottom surface 212, and do not have a driving force (see FIG. 4). The auxiliary balls 232 are positioned at substantially 90° from each of the rotary legs 231 (see FIG. 2(B)), and a height thereof from the bottom surface 212 is set to contact with the floor surface at the same timing as the rotary legs 231 (see FIG. 2(A)).

The rotary legs 231 and the auxiliary balls 232 are thus arranged so that the movable robot 110 can be placed on the floor surface in a stable state without inclining the main body 211, and the movable robot 110 can smoothly perform the moving operation and the rotating operation. A specific configuration of the moving mechanism 230 is arbitrary, if the moving mechanism 230 enables the movable robot 110 to perform the forward movement operation, the rotating operation, it may be used as a moving mechanism of Embodiment 1.

The movable robot 110 individually controls the rotation of the pair of rotary legs 231, thereby it becomes capable of performing a linear motion, a rotating motion, a right turning motion, a left turning motion, and the like. When the movable robot 110 is desired to perform the linear motion, for example, the pair of rotary legs 231 are controlled to rotate at the same rotational speed in the same direction. On the other hand, when the movable robot 110 is desired to rotate at the same place without moving, the pair of rotary legs 231 are controlled to rotate at the same rotational speed in opposite directions each other.

Figure 6:
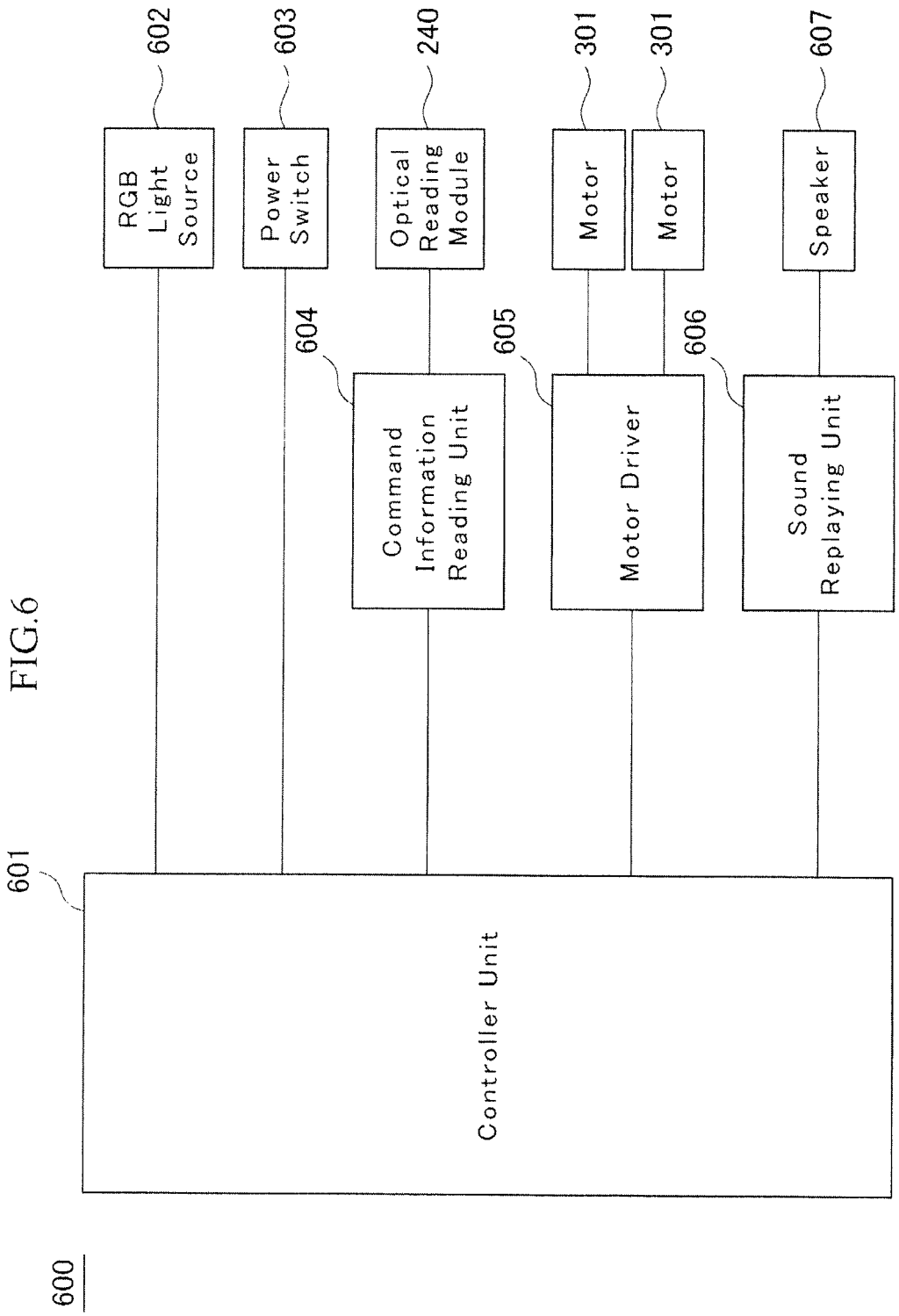
FIG. 6 is a schematic block diagram illustrating a control circuit of the movable robot according to Embodiment 1 of the present invention.

Note that, although not illustrated in FIG. 1 and FIGS. 2(A), 2(B), the movable robot 110 is provided with a speaker 607 to reproduce voice and sound (see FIG. 6).

As illustrated in FIG. 1, the plurality of command panels 121 are arranged side by side on the floor surface to form the moving path 120 for the movable robot 110. The moving path 120 need not be formed only of command panels 121, and may be formed by using both of the command panels 121 and another panels (including no command information). It is preferred that the command panels 121 are formed of a material such as a resin which has high safety for infants.

Each of the command panels 121 includes the individually set command information. The command information is information to define the action performed by the movable robot 110, and the action includes starting a movement, stopping the movement, rotating, changing a moving direction (right turning, left turning, or the like), emitting light of color specified by the command information, reproducing voice or sound, or the like, but may include the other action.

A method of adding the command information to the command panel 121 is not limited to a particular method. The method may be a method of optically reading a barcode, a two-dimensional code, or the like, a method of magnetically recording the information, a method of using an IC (Integrated Circuit) chip, or the like, or another method. The command information may be added on a surface of the command panel 121 by printing, or added to inside or a back surface of the command panel 121. In other words, any method can be adopted if the movable robot 110 positioned on a command panel 121 can read the corresponding command information. The method of adding the command information to the command panel 121 is preferably a method that enables to add the command information in a state difficult to visually recognize data with sufficiently large capacity, and in that sense, it is preferable to adopt a method of reading a dot pattern formed using the Grid Onput technology (Japanese Patent No. 5819364) of Gridmark Inc. using the optical reading module 240.

It is preferable that the command information includes information required for the movable robot 110 to correct the trajectory. For example, the movable robot 110 may detects not only the content of the command information but also the printed position of the command information to determine a deviation of an actual trajectory relatively from a preset trajectory and correct the trajectory based on the determination result. Furthermore, not only the command information but also a mark to correct the trajectory may be printed on the command panel 121.

Figure 5:
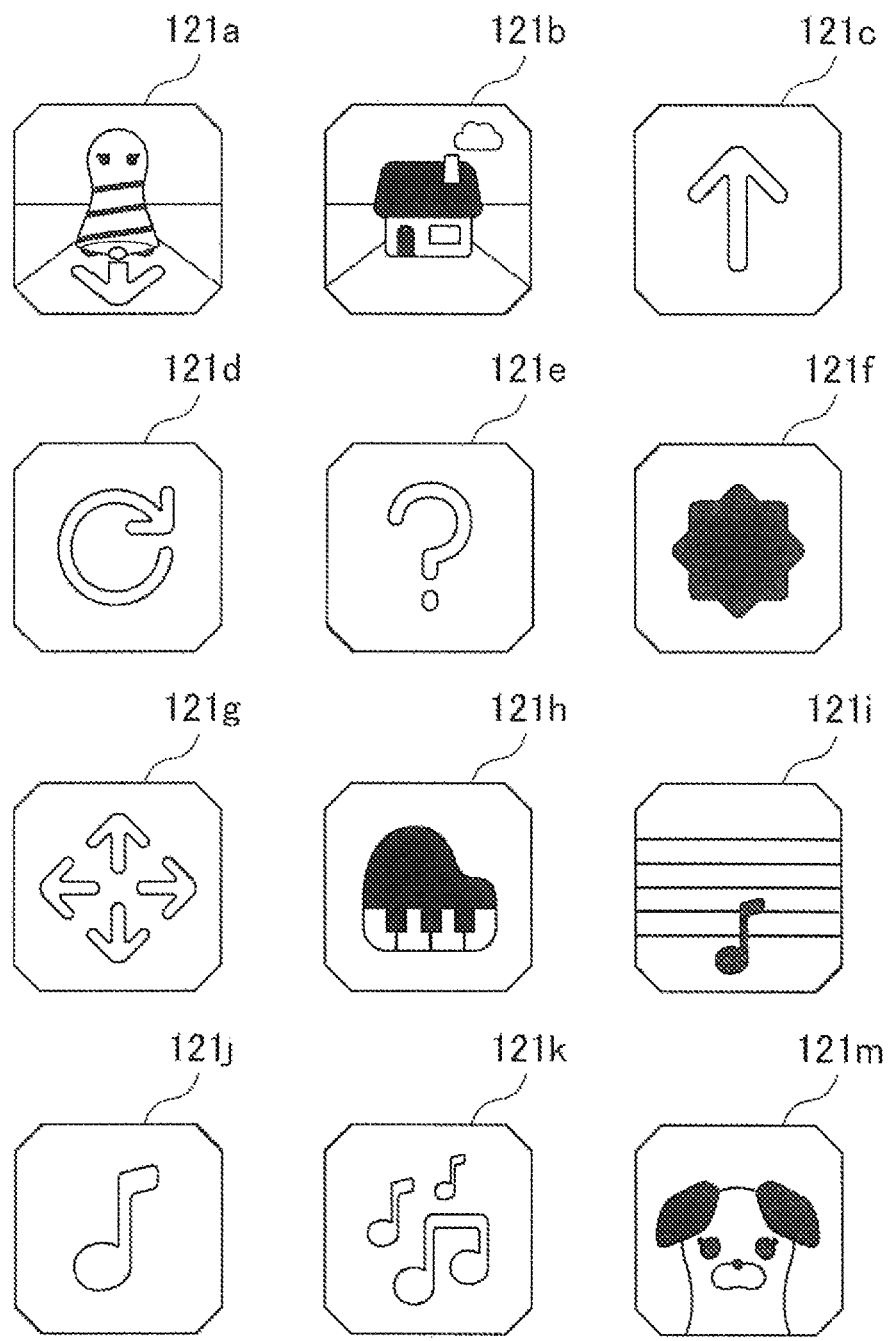
FIG. 5 is a planar view illustrating multiple examples of command panels according to Embodiment 1 of the present invention.

As illustrated in FIG. 5 as an example of a part of command panels 121, a picture pattern representing the command information included in each of the command panels 121 is shown on a front surface of the command panel 121.

In FIG. 5, a command panel 121a is a panel including the command information to cause the movable robot 110 to start moving, and is arranged at a start point of the moving path 120.

A command panel 121b includes the command information to cause the movable robot 110 to stop moving, and is arranged at a goal point of the moving path 120. Note that a plurality types of actions may be performed by the movable robot 110 based on the command information included in the one command panel 121b in such a way that fanfare sound is reproduced simultaneously when the movement of the movable robot 110 stops, for example.

A command panel 121c includes the command information to define the moving direction of the movable robot 110. When the command panel 121c is arranged so that a direction of an arrow shown on the front surface of the command panel 121c indicates the same direction as the advancing direction of the movable robot 110, for example, the movable robot 110 directly advances as it is. On the other hand, when the command panel 121c is arranged so that the direction of the arrow shown on the front surface of the command panel 121c indicates the right direction, the movable robot 110 turns right on the command panel 121c. Similarly, when the command panel 121c is arranged so that the direction of the arrow shown on the front surface of the command panel 121c indicates the left direction, the movable robot 110 turns left on the command panel 121c.

A command panel 121d includes the command information to cause the movable robot 110 to rotate once on the command panel 121d.

A command panel 121e is a panel for setting an arbitrary action by a player, a purchaser (for example, a parent of the player), or the like. The command panel 121e previously includes the command information, but the action corresponding to the command information is not set. To set the action, the purchaser or the like may transmit the information to set the action to the movable robot 110 using a smartphone, a personal computer, or the like, for example.

A command panel 121f includes the command information to flash the light emitting portion 220 of the movable robot 110 in a predetermined color. The light emitting color can be set corresponding to the color of the picture pattern in such a way that the light emitting portion 220 of the movable robot 110 blinks red when a picture pattern of the command panel 121f is indicated in red, and the light emitting portion 220 blinks blue when a picture pattern is indicated in blue, for example. The light emitting color of the light emitting portion 220 is changed each time the movable robot 110 passes over the command panel 121f corresponding to a different light emitting color. The color change corresponds to the "wearing change" of the movable robot 110. Note that a plurality types of actions may be performed by the movable robot 110 based on the command information included in the one command panel 121f in such a way that the movable robot 110 is rotated once with light emitted from the light emitting portion 220, for example.

A command panel 121g includes the command information to cause the movable robot 110 to determine the advancing direction in accordance with the light emitting color of the light emitting portion 220. The advancing direction of the movable robot 110 can be determined in such a way that when the movable robot 110 passes over the command panel 121g, the movable robot 110 directly advances if the light emitting portion 220 emits red light, turns right if the light emitting portion 220 emits blue light, turns left if the light emitting portion 220 emits yellow light, and moves back if the light emitting portion 220 emits green light, for example. Although four arrows are shown on the command panel 121g, it is preferable that a color of each arrow is set to coincide with the advancing direction of the movable robot 110. In other words, the command panel 121g corresponds to "IF" statement (i.e, a branch instruction) of the programming language. Thus, the movable robot 110 according to Embodiment 1 can perform one action based on a combination of a plurality of command information respectively included in each of two command panels 121f, 121g.

When the command panel 121 is not arranged on a right side of the command panel 121g for determining the advancing direction (that is, a direction where the movable robot 110 advances when the light emitting portion 220 of the movable robot 110 emits the blue light) even though the command panel 121f including the command information that the light emitting portion 220 of the movable robot 110 emits the blue light is arranged before the command panel 121g, for example, the movable robot 110 deviates from the moving path 120. In such a case, it is preferable that the movable robot 110 performs an error operation. As an example of the error operation, when the movable robot 110 deviates from the moving path 120, the movable robot 110 can stop the movement while generating error sound.

When the movable robot 110 reaches the command panel 121g for determining the advancing direction even though the movable robot 110 has not passed over the command panel 121f for emitting light, for example, the movable robot 110 may generate the error sound while stopping on the command panel 121g.

A command panel 121h includes the command information to cause the movable robot 110 to set the instrument for reproducing sound. A picture of the piano is shown on the command panel 121h, and the instrument for reproducing sound is set to the piano, but the command panel 121 for setting a sound of the other instrument may be provided. Note that the command information of the command panel 121h is used only for causing the movable robot 110 to set the instrument for reproducing sound, and does not include the sound reproduction command.

A command panel 121i includes the command information to cause the movable robot 110 to output a sound of a predetermined note in a musical scale. The command panel 121i shows an example of the note "Do" in the musical scale, but the command panel 121 for setting the other note may also be provided. Thus, the movable robot 110 according to Embodiment 1 can perform one sound replaying operation based on a combination of command information included in each of two command panels 121h, 121i. The plurality of command panels 121 each including the command information to cause the movable robot 110 to output a sound of a predetermined note in the musical scale are arranged side by side after the command panel 121h, thereby it becomes capable of replaying a desired melody by the piano sound. When the movable robot 110 passes over the plurality of command panels 121, the moving speed of the movable robot 110 may be increased. On the other hand, the movable robot 110 may not replay sounds while moving, but sequentially store the musical notes while passing over the command panels 121 for outputting the musical notes, and the movable robot 110 may replay the melody consisting of these musical notes a predetermined number of times when the movable robot 110 reaches the command panel 121b at the goal point.

A command panel 121j includes the command information to cause the movable robot 110 to replay a predetermined single sound (a beep or a short melody).

A command panel 121k includes the command information to cause the movable robot 110 to replay a predetermined harmonious sound (a beep or a short melody).

A command panel 121m includes the command information to cause the movable robot 110 to replay a sound of a predetermined animal. A picture of a dog is shown on the command panel 121m, and the animal for replaying sound is set to the dog, but the command panel 121 for setting a sound of the other animal may be provided.

Thus, according to Embodiment 1, various command panels 121 are arranged between the command panel 121a for start and the command panel 121b for goal, thereby enables a player such as an infant to learn a basic computer programming considering the actions of the movable robot 110 as the computer processing. A basic programming technique such as a "branch" and a "loop" can also be learned using the command panel 121g for determining the advancing direction (corresponding to the IF statement of the computing language), for example. Furthermore, "debugging" can be learned by introducing the concept of "stop by an error."

Note that regarding a part or all of the command panels 121, a player or the like may draw pictures on the command panels instead of using the command panels on which picture patterns are previously printed.

As described above, the control circuit 600 as illustrated in FIG. 6 is arranged in the main body 211 of the movable robot 110.

As illustrated in FIG. 6, a controller unit 601 of the control circuit 600 is connected with the RGB light source 602, a power switch 603, a command information reading unit 604, a motor driver 605, and a sound replaying unit 606.

The controller unit 601 controls the RGB light source 602, the motor driver 605, and the sound replaying unit 606 based on the command information received from the command information reading unit 604 to cause the movable robot 110 to perform each action as described above.

The RGB light source 602 makes the light emitting section 220 of the movable robot 110 emit the light in a predetermined color based on the control by the controller unit 601. The RGB light source 602 is constituted by reed, green, and blue LEDs, for example.

The power switch 603 is, but not necessarily, a switch to turn on/off the power source of the movable robot 110. It is preferable that the power switch 603 is arranged in an inconspicuous place of the main body 211 or the bottom surface 212 of the movable robot 110 (not illustrated in FIG. 1 to FIG. 4).

The command information reading unit 604 determines the contents and the position of the command information based on the optical information read by the optical reading module 240, and transmits to the controller unit 601. The optical reading module 240 has a two-dimensionally arrayed optical sensor, for example.

The motor driver 605 drives the pair of motors 401 based on the control by the controller unit 601. As described above, the rotational speeds and the rotating directions of the motors 401 are individually determined according to the command information of the corresponding command panel 121.

The sound replaying unit 606 replays the voice or sound from the speaker 607 based on the control by the controller unit 601. As described above, the type of sound, the musical scale and the like replayed from the speaker 607 are determined according to the command information of the corresponding command panel 121.

The main body 211 stores not only such a control circuit but also a battery (not illustrated). The type of battery is not limited, and may be a dry battery or a rechargeable battery.

Although not illustrated in FIG. 6, the control circuit 600 may be connected with an acceleration sensor and a microphone for voice recording to thereby enable the movable robot 110 to perform more complicated action.

Next, a method of playing with the educational toy 100 according to Embodiment 1 will be described below.

A player such as an infant arranges the command panel 121a for a start point on the floor surface, or the like.

A desired command panel 121 is arranged adjacently to the command panel 121a, and the command panels 121 are sequentially arranged side by side.

Furthermore, the command panel 121b for a goal point is arranged at the end of line of command panels 121.

The power switch 603 of the movable robot 110 is turned on, the movable robot 110 is placed on the command panel 121a for a start point to start moving. The movable robot 110 sequentially reads the command information of the command panel 121 while moving on the moving path 120 to sequentially perform the action corresponding to the command information.

As a result of these actions, if the movable robot 110 reaches the command panel 121b for a goal point and stops on the command panel 121b, the play is "successful". On the other hand, if the movable robot 110 does not reach the command panel 121b, the play is "failed".

In Embodiment 1, there is also provided a toy which causes the movable robot 110 to perform one independent action using one command panel 121 as the command panels 121, or a toy which causes the movable robot 110 to perform one independent action based on the combination of two or more command panels 121 such as the combination of the command panels 121f, 121g, and a combination of the command panels 121h, 121i. Accordingly, the difficulty level of the playing mode is increased in accordance with the growth of infant.

As described above, according to Embodiment 1, when the command panels 121 including command information are arbitrarily arranged to form the moving path 120 by player, and the movable robot 110 sequentially reads the command information while moving on the moving path 120, the actions of the movable robot 110 can be determined. Accordingly, the player can freely set the action of the robot without using the display and the input device, thereby enabling even the infant of low age to easily play with interest.

According to Embodiment 1, the educational toy 100 is configured to read the command information included in the command panel 121 by the optical reading module 240, thereby it becomes capable of providing the educational toy 100 at low cost.

Furthermore, according to Embodiment 1, the movable robot 110 can correct the trajectory in accordance with the detected position of the command information, thereby it becomes capable of easily preventing the movable robot 110 from deviating from the moving path 120.

According to Embodiment 1, the actions performed by the movable robot 110 includes a forward movement operation, a stop operation, a rotating operation, an advancing direction change operation, a light flashing operation, and a sound replaying operation, thereby it becomes capable of providing a play that interests even an infant of low age.

According to Embodiment 1, the movable robot 110 performs a plurality types of actions based on the command information included in one command panel 121, thereby not only improving amusement of the toy, but also becoming capable of providing an amusement that even an infant of low age can play with interest. According to Embodiment 1, the action of the movable robot 110 is determined based on the combination of a plurality of command information respectively included in each of the plurality of command panels 121, thereby it becomes capable of providing a playing mode with a slightly higher difficulty level compared with a case of determining the action of the movable object based on only the command information included in the one command panel 121.

Embodiment 2 of the Invention

Embodiment 2 of the present invention will be described with reference to FIG. 7.

Embodiment 2 differs from Embodiment 1 in that in a configuration of a moving path.

Figure 7:
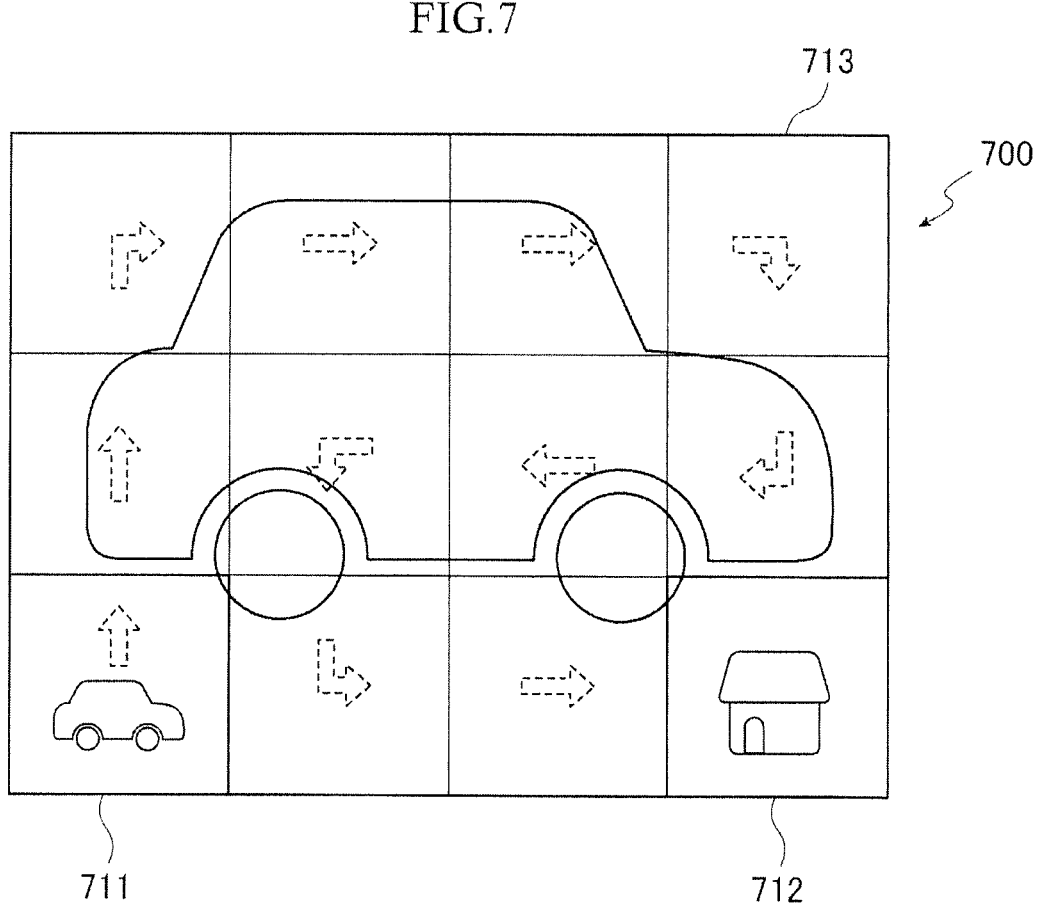
FIG. 7 is a schematic plan view illustrating a configuration of a moving path of an educational toy according to Embodiment 2 of the present invention.

In Embodiment 2, a moving path 700 is formed by arranging a command panel 711 for start, a command panel 712 for a goal, and the other plurality of command panels 713 longitudinally and laterally, as illustrated in FIG. 7.

The divided pieces of a picture are shown on the command panels 711-713, respectively. The command panels 711-713 are correctly arranged to thereby complete the picture.

The command panels 711-713 are arranged, the power switch 603 (see FIG. 6) of the movable robot 110 is turned on, and the movable robot 110 is placed on the command panel 711 for start point to start moving. The movable robot 110 sequentially reads the command information of each of the command panels 711-713 while moving on the moving path 700, and sequentially performs the actions corresponding to the command information.

If the plurality of command panels 711, 712, 713 forms a correct picture as a whole, the movable robot 110 reaches the command panel 712 for a goal point and stops on the command panel 712. On the other hand, the plurality of command panels 711, 712, 713 are erroneously arranged, the movable robot 110 does not reach the command panel 712 for a goal point and deviates from the moving path 700.

Thus, the player can play a puzzle game using the computer educational toy of the present invention, thereby enabling even the infant of low age to easily play with interest.

In Embodiment 2, it is possible to obtain the same effect as Embodiment 1.

What is claimed is:

1. An educational toy that causes a movable object of self-running type to move on a moving path, comprising
   a plurality of command panels, each command panel including a picture pattern representing command information readable by a reading module provided in the movable object,
   wherein,
   the moving path is configured by arranging, in an arbitrary sequence, a part or all of the plurality of command panels arbitrarily selected by a player, and
   the movable object sequentially reads, using the reading module, the command information respectively included in each command panel of the plurality of command panels over which the movable object passes, while moving on the moving path, and sequentially performs a series of actions corresponding to the command information being read, and
   wherein,
   the movable object is provided with a movement function, a light flashing function and a sound reproduction function, and
   the picture pattern representing the command information included in the command panel is shown on a front surface of the command panel.

2. The educational toy according to claim 1, wherein the picture pattern included in the command panel comprises pattern information formed to be readable by an optical reading module.

3. The educational toy according to claim 1, wherein
   the movable object detects a position of the picture pattern formed on the command panel to determine a deviation of an actual trajectory relatively from a preset trajectory and correct the actual trajectory to the preset trajectory.

4. The educational toy according to claim 1, wherein the actions performed by the movable object include at least any one of starting a movement, stopping the movement, rotating, changing a moving direction to a predetermined direction, flashing a light emitting section of the movable object in a predetermined color, and replaying sound.

5. The educational toy according to claim 1, wherein the plurality of command panels include one command panel to cause the movable object to perform the plurality types of actions based on the command information included in the one command panel.

6. The educational toy according to claim 1, wherein the plurality of command panels include a plurality of command panels to cause the movable object to perform one type of action based on a combination of a plurality of the command information respectively included in each of the plurality of command panels.

7. A panel that is used as the command panel according to claim 1.

8. The educational toy according to claim 1, wherein the movable object performs the movement function, the light flashing function or the sound reproduction function according to the command information represented by the picture pattern.

9. The educational toy according to claim 1, wherein a light emitting section is provided in a side surface of a main body of the movable object.

10. The educational toy according to claim 9, wherein one command panel of the plurality of command panels includes the command information to flash the light emitting section of the main body in a predetermined color which is settable corresponding to a color of the picture pattern of the command panel.

11. The educational toy according to claim 9, wherein one command panel of the plurality of command panels includes the command information to cause the movable object to determine an advancing direction in accordance with a light emitting color of the light emitting section of the main body.

12. The educational toy according to claim 9, wherein one command panel of the plurality of command panels includes the picture pattern which is a picture of four arrows and a color of each arrow of the four arrows is settable to coincide with an advancing direction of the movable object.

13. The educational toy according to claim 9, wherein one command panel of the plurality of command panels includes the picture pattern which is a picture of a piano to represent the command information of reproducing a piano sound, one other command panel of the plurality of command panels includes the picture pattern which is a picture of a musical note to represent the command information to cause the movable object to output sound of a predetermined note in a musical scale, and the movable object is to perform one sound replaying operation based on a combination of the command information represented by the picture pattern in the one command panel and the other command panel.

14. The educational toy according to claim 13, wherein each of a plurality of other command panels arranged side by side after the one other command panel include the picture pattern to represent the command information to cause the movable object to output sound of a predetermined note in a musical scale to thereby become capable of replaying a desired melody by a piano sound.

15. The educational toy according to claim 1, wherein when the movable object deviates from the moving path, the movable object is to stop a movement while generating an error sound.

16. An educational toy that causes a movable object of self-running type to move on a moving path, comprising
a plurality of command panels, each command panel including a picture pattern representing command information readable by a reading module provided in the movable object,
wherein the moving path is configured by arranging, in an arbitrary sequence, a part or all of the plurality of command panels arbitrarily selected by a player, and
the movable object sequentially reads, using the reading module, the command information respectively included in each command panel of the plurality of command panels over which the movable object passes, while moving on the moving path, and sequentially performs a series of actions corresponding to the command information being read, and
wherein the plurality of command panels include a command panel including a picture pattern representing start and a command panel including a picture pattern representing a goal point,
each of the plurality of command panels include a divided piece of a picture and the plurality of command panels are to be arranged to thereby complete the picture, and
when the plurality of command panels are arranged to form the complete picture, the movable object is movable to reach the command panel including the picture pattern representing the goal point based on the read command information.

* * * * *